United States Patent [19]

Hashimoto et al.

[11] Patent Number: 4,712,135
[45] Date of Patent: Dec. 8, 1987

[54] IMAGE PICKUP APPARATUS

[75] Inventors: Seiji Hashimoto, Yokohama; Takao Kinoshita; Nobuyoshi Tanaka, both of Tokyo, all of Japan

[73] Assignee: Canon Kabushiki Kaisha, Tokyo, Japan

[21] Appl. No.: 922,812

[22] Filed: Oct. 17, 1986

Related U.S. Application Data

[63] Continuation of Ser. No. 873,067, Jun. 4, 1986, abandoned, which is a continuation of Ser. No. 560,836, Dec. 13, 1983, abandoned.

[30] Foreign Application Priority Data

Dec. 22, 1982 [JP] Japan ................................. 57-225628

[51] Int. Cl.$^4$ .............................................. H04N 3/14
[52] U.S. Cl. ............................ 358/213.22; 358/213.16; 358/213.18; 358/213.28; 358/909
[58] Field of Search .............. 358/211, 213.16, 213.18, 358/213.22, 213.26, 213.28, 909; 357/24 LR

[56] References Cited

U.S. PATENT DOCUMENTS

| | | | |
|---|---|---|---|
| 3,801,884 | 4/1974 | Sequin | 317/235 G |
| 3,932,775 | 1/1976 | Kosonocky | 357/24 |
| 4,415,937 | 11/1983 | Nishizawa | 358/213 |
| 4,481,538 | 11/1984 | Battson et al. | 358/213 |
| 4,499,496 | 2/1985 | Tanaka | 358/213 |
| 4,504,866 | 3/1985 | Saito | 358/209 |
| 4,514,765 | 4/1985 | Miyata et al. | 358/213 |
| 4,527,199 | 7/1985 | Kinoshita | 358/213 |
| 4,631,593 | 12/1986 | Kinoshita | 358/909 |

*Primary Examiner*—Gene Z. Rubinson
*Assistant Examiner*—L. C. Schroeder
*Attorney, Agent, or Firm*—Fitzpatrick, Cella, Harper & Scinto

[57] ABSTRACT

An image pickup apparatus comprises a charge transfer type of image sensor having electrodes which can form a plurality of potential wells in each picture element of the photo-receiving surface including a plurality of picture elements; and a control circuit having a mode in that the electrodes are controlled so as to respectively form only one potential well in each of the picture element when storing charges and to sequentially read out the charges in each potential well, and a mode in that the electrodes are controlled so as to respectively form a plurality of potential wells in each of the picture elements when storing charges and to mix the charges in a predetermined plurality of potential wells and to sequentially read out them.

34 Claims, 8 Drawing Figures

IMAGE PICKUP APPARATUS

This applicaiton is a continuation of application Ser. No. 873,067, filed June 4, 1986, now abandoned, which is a continuation of application Ser. No. 560,836, filed Dec. 13, 1983, now abandoned.

FIELD OF THE INVENTION

The present invention relates to an image pickup apparatus using a solid-state image pickup device.

BACKGROUND OF THE INVENTION

Recently, so-called portable video recorders in which a video camera and a VTR are miniaturized have been popularly developed; however, in the future, 8-mm video recorders in which a video camera and a VTR are integrally built will be highlighted as a further advanced form.

Such miniaturization of electronic equipment particularly largely depends upon the semiconductor technology. The photoelectric converting section of the abovementioned video camera is also being replaced by solid-state image pickup devices in place of an image pickup tube owing to such advancement of the semiconductor technology. At present, these solid-state image pickup devices of this kind have many excellent characteristics as compared with conventional image pickup tubes.

In other words, as solid-state devices, they have many characteristics such as small dimensions, low electric power consumption, mass producibility, low heat generation and the like.

As described above, due to establishment of the technology of the solid-state image pickup devices having such many characteristics and due to development of supersmall-sized magnetic recording apparatus, the conventional silver salt photographic technology using silver salt films as a recording medium is being replaced by magnetic photographic or electronic photographic technology which requires no development processing.

If a main object of VTRs is to record a motion picture image in a VTR and to display it by a television, which is a principal method of use of present VTRs, is called a movie video, and if a main object is to record a still picture image in a recording apparatus and to display the recording signal on a television screen or to print it by a printer is called a still video, there is not a great difference in signalling format between the movie video and the still video since the signal is converted into a TV signal.

However, an object is in general continuously photographed in case of the movie video, while an object image is instantaneously photographed in the same manner as an ordinary camera in case of the still video. Therefore, it is necessary to make the operations largely different with respect to responsibilities of an iris, shutter, AGC, white balance, etc. and in addition, since their methods of driving the solid-state image pickup devices are different, there is a problem such that it is impossible to use a VTR provided with only the present optical and signal processing systems for both movie and still videos.

In case of commonly utilizing a camera section for both movie and still images, there occurs problems in particular with respect to methods of storage and readout of charges by solid-state image pickup devices. Although a MOS type device, interline type CCD (IL-CCD), frame transfer type CCD (FT-CCD), and the like have been known as solid-state image pickup devices, the FT-CCD will be described here as an example since their fundamental structures are similar and are not essential for the present invention.

As shown in FIG. 1, the FT-CCD comprises: an image pickup part 1 as a radiation receiving section consisting of a plurality of photoelectric converting picture elements for converting the radiation from an object image into charges; a memory part 2 for temporarily storing the signal charges from the image pickup part 1; a horizontal shift register part 3 for reading out the signal charges from the memory part 2 synchronously with the timing of a TV sync signal; and an on-chip amplifier part 4 for amplifying the signal charges from the horizontal shift register part 3 to output as a signal voltage. $\phi_{PI}$ and $\phi_{PS}$ denote vertical shift pulses in the image pickup part 1 and memory part 2, respectively, and $\phi_S$ represents a horizontal shift pulse in the horizontal shift register part 3.

In case of using such an FT-CCD as a movie camera, the photoelectric conversion is performed in the image pickup part in one field period as described above and these photoelectric converted signal charges are transferred to the memory part by the vertical shift pulses of several MHz in the vertical blanking period. The signal charges in the memory part are transferred to the horizontal shift register part in the horizontal blanking period at every one horizontal scan in the next field period, and they are read out as a CCD signal from the on-chip amplifier at the next stage. The image pickup part is in the photoelectric conversion state during this interval. Namely, the photoelectric conversion and vertical charge transfer are repetitively executed for every one field, thereby obtaining a continuous video signal.

In this case, since the first and second fields are interlacingly scanned by a television receiver, the information of both fields have to be formed in the mutually interlaced relationship at the time of the photoelectric conversion. Assuming that the image pickup part 1 has the vertical picture elements of the number which is twice the number of scanning lines of the TV receiver, such a problem as mentioned before will not be caused. However, it is extremely difficult to integrate the image sensors of such a number of picture elements in a limited space and to manufacture them.

Therefore as shown in U.S. Pat. No. 3,801,884, a method is considered whereby the position of the potential well is vertically shifted for every field by changing the level of the voltage to be applied to the vertical transfer electrode of the image pickup part 1 for every field.

According to this method, since the charge signal in the image pickup part is stored in the potential wells arranged under the different lines for every field, even if the number of vertical picture elements of the image pickup part is equal to only one field, it is possible to obtain the interlaced two-field signals, respectively.

However, with such a constitution, a problem will be caused such that the levels of dark current noises differ for every field.

This point will be described below. That is to say, the sensitivity of a camera is generally largely affected by a dark current relating to crystal defect of the image pickup device. FIG. 2 shows the relation between the dark current level of such a solid-state image pickup device and the drive pulse level. In the diagram, the ordinate denotes the output voltage of the dark current and the of abscissa indicates the drive pulse voltage. It will be appreciated from FIG. 2 that the dark current includes a bulk noise consisting of constant dark current components irrespective of the drive pulse voltage and a surface noise which increases with an increase of the drive pulse voltage.

In the case where the solid-state image pickup device is driven in the movie video mode conventionally, a drive pulse such as shown in FIG. 3 is supplied to the image pickup device to interlace a picture image as described above. In FIG. 3, $T_2(T_2')$ of $\phi_{PI}$ represents a charge accumulation period in the image pickup part and $T_2(T_2')$ of $\phi_{PS}$ indicates a charge transfer period from the memory part to the horizontal readout part. On the other hand, the information charges stored in the image pickup part are transferred to the memory part at a high speed in the period of $T_1(T_1')$. In FIG. 3, assuming that the charges accumulated in the period of $T_2$ correspond to the signal of the fields bearing odd numbers and the charges to be accumulated in the period of $T_2'$ correspond to the signal of the fields bearing even numbers, the signal of the even-number fields has a drawback such that the dark current noise level becomes much larger than the signal level of the odd-number fields as is obvious from FIG. 2 since the drive pulse voltage is high at $V_H$. Therefore, the S/N ratio of the signal would have changed for every field, causing a drawback of occurrence of flicker.

SUMMARY OF THE INVENTION

It is an object of the present invention is to provide an image pickup apparatus which can solve such problems as described above and can be commonly used in both movie and still modes.

Another object of the present invention is to provide an image pickup apparatus of the kind in which the dark current noise level does not change for every field in the movie mode, and while the amount of dark current noise is reduced in the still mode.

DETAILED DESCRIPTION OF THE PREFERRED EMBODIMENTS

Figure 1:
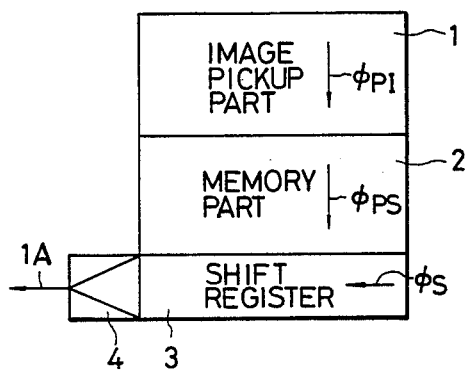
FIG. 1 is a constructional diagram of a CCD of the frame transfer type.
Figure 2:
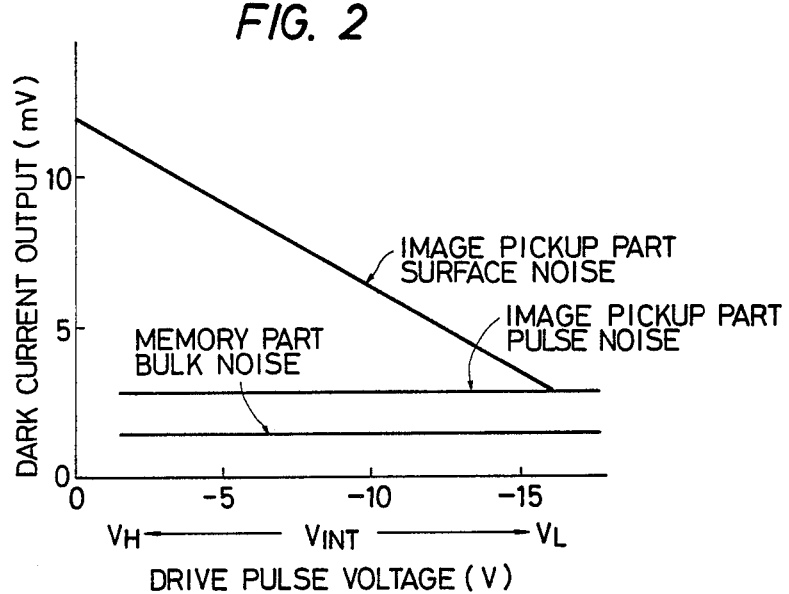
FIG. 2 is a diagram showing noise characteristics in an image sensor.
Figure 4:
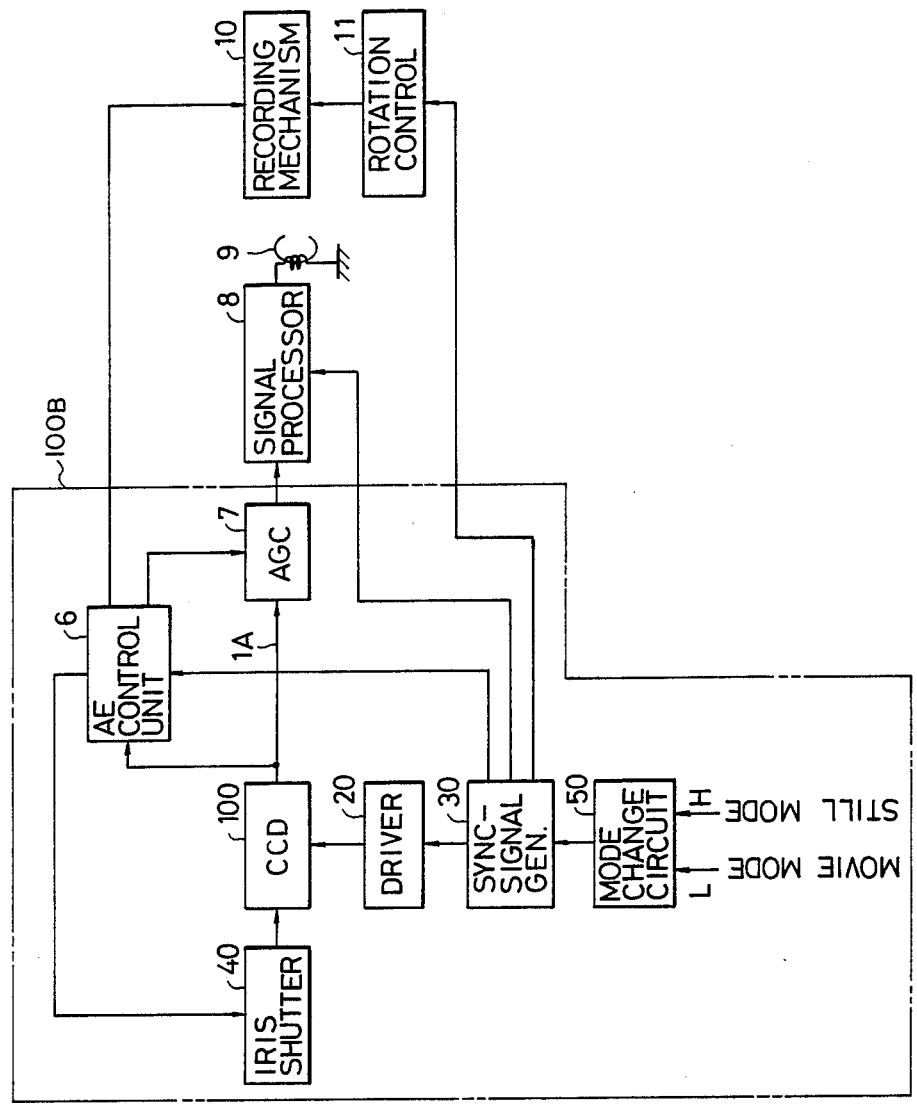
FIG. 4 is a diagram showing an example of a constitution of an image pickup apparatus according to the present invention.
Figure 5:
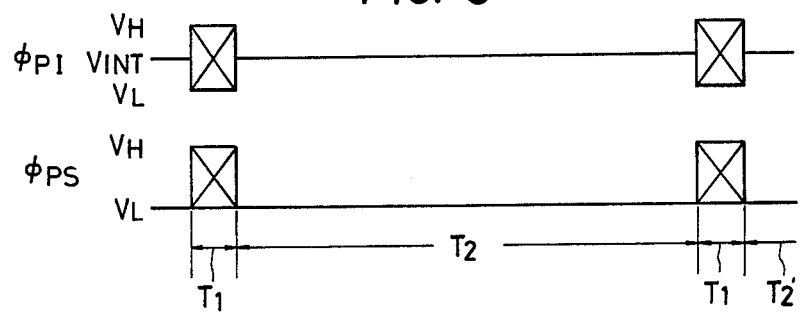
FIG. 5 is a timing chart of the sensor drive pulses in the movie mode of the present invention.
Figure 6:
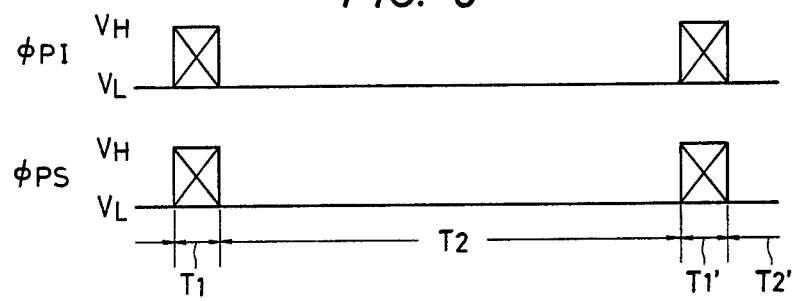
FIG. 6 is a timing chart of the sensor drive pulses in the still mode of the present invention.
Figure 7:
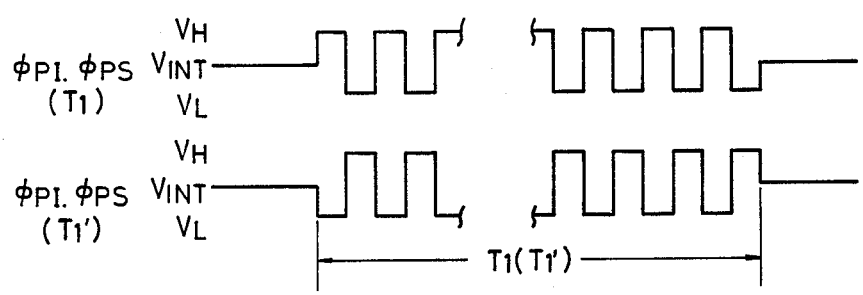
FIG. 7 is an explanatory diagram showing the main part of the timing shown in FIG. 5.

An embodiment of the present invention will now be described hereinbelow. FIG. 4 is a diagram showing a constitution of an image pickup apparatus according to the present invention using an FT-CCD. A CCD 100 of FIG. 4 is an FT-CCD having a structure shown in FIG. 1, in which the image pickup part as the radiation receiving section consists of the picture elements having, e.g., about 570 elements in the horizontal direction and about 245 elements in the vertical direction. The operation of the image pickup part has already been described before; therefore, it need not be repeated here. A sync signal generator 30 as control means generates pulses with the timing such as shown in FIGS. 5-7 for driving the CCD 100. These pulses are converted by a driver 20 into the suitable drive potentials of the levels such as shown in FIGS. 5-7, thereby driving the CCD 100. An iris and a shutter 40 are provided in the radiation incident optical path of the CCD 100 and this iris and shutter 40 control the incident light in a manner such that the output signal 1A of the CCD 100 becomes the standard operation signal level under the control of an AE control unit 6.

The AE control unit 6 acts to average the output signal level of the CCD 100 at the portion corresponding to a proper field of vision, thereby to determine the operations of the iris and shutter 40. In this case, if the amplitude of the signal 1A is insufficient even when the iris is released, an AGC circuit 7 serves to variably control the amplification factor of the signal 1A in response to the control voltage of the AE control unit 6.

The CCD signal which is controlled to the proper signal level by the AGC 7 is modulated by a signal processor 8 constituted by an encoder and a processor at the next stage to record on a magnetic disc or a magnetic tape. A reference numeral 9 denotes a recording head and a recording mechanism 10 comprises a magnetic recording apparatus using a motor as a drive source. A numeral 11 is a rotation control unit. The signal processor 8, recording head 9, recording mechanism 10, rotation control unit 11, etc. together constitute recording means. The rotation control unit 11 serves to control the speed and phase of the motor in the recording mechanism by the control pulses from the sync signal generator 30 in order to record the modulation signals adapted to the movie mode as the second mode and to the still mode as the first mode which will be described later.

A mode change circuit 50 constitutes mode setting means of the present invention. When the movie mode is selected by the mode change circuit 50, a voltage at L level as the second instruction signal is output from the mode change circuit 50. In association with this, the sync signal generator 30 generates the control pulse of the movie mode as the second mode in response to this L-level voltage. Namely, when a recording switch (not shown) is turned on, each mechanism part and each circuit are energized by a power supply, so that the recording is started. In this case, since the movie mode represents continuous recording, the AE control unit 6 controls the iris 40 and AGC 7 performs feedback control with a proper time lag.

When the still mode is selected by the mode change circuit 50 in this state, a voltage at H-level as the first instruction signal is output from the mode change circuit 50. In association with this, the sync signal generator 30 generates the control pulse of the still mode as the first mode in response to this H-level voltage, thereby internally changing the AE control unit 6 and recording mechanism 10 to the still mode. This internal switchover enables "electronic still photograph" to be recorded in response to ON-OFF operation of the recording switch.

At this time, the AE control unit 6 computes an optimum exposure value in the first several fields, thereby allowing the iris and shutter 40 to be controlled so as to set the diaphragm value and shutter speed specified by the output of this control unit 6 in the next fields after the calculation. Thus, the AGC 7 is held in a constant gain state at one field interval and the video signal on the basis of these results is recorded in a recording medium. The above description relates to the case where the magnetic recording part, which can operate in both movie and still modes, is provided in the above-described solid-state image pickup apparatus. However, if one desires to miniaturize such a solid-state image pickup apparatus to a small shape like an ordinary camera for silver salt films, the recording time would be shortened in the movie mode since the memory capacity is limited. In case of photographing for a long time in the movie mode, an ordinary video camera which commonly uses a section indicated by a block 100B of FIG. 4 may be constituted and the section at the subsequent stages may be constituted by a supersmallsized VTR of the helical scan type.

Furthermore, in the embodiment of the present invention, different charge accumulation voltages are applied as the drive pulses $\phi_{PI}$ in the still and movie modes, thereby improving the dark current noise. In other words, the drive pulse of FIG. 5 is supplied from the driver 20 in the movie mode, while the drive pulse of FIG. 6 is supplied from the driver 20 in the still mode. This is because it is not necessary to set the drive pulse $\phi_{PI}$ into the voltage level $V_{INT}$ of FIG. 5 or into the voltage level $V_H(T_2'$ period) of FIG. 3 since the photograph is a one-shot photograph in the still mode.

Therefore, in the still mode, the use of the drive pulse such as shown in FIG. 6 enables a high-quality picture image with little dark current noise to be obtained. Namely, since the bias voltage to the transfer electrodes in the charge accumulation period is kept to the $V_L$ level in the still mode, the dark current noise is suppressed to be minimum. On the other hand, when the above-mentioned bias voltage is set into $V_H$ in the accumulation period even in the movie mode, the dark current noise increases in response to it. Therefore to prevent this, as shown in FIG. 5, by setting the charge accumulation voltage at the image pickup part into an almost intermediate voltage $V_{INT}$ between $V_H$ and $V_L$, the dark current noises included in both odd-number and even-number field signals are substantially averaged, thereby improving the unbalance between the dark current noises in the odd-number and even-number fields and improving the picture quality.

The interlacing in this case can be accomplished by inverting the polarities of the transfer pulses at $T_1$ and $T_1'$ by adding a phase difference of 180° to them as shown in FIG. 7 when the charges stored in the image pickup part are transferred to the image part at a high speed. That is to say, the imaginary number of vertical picture elements is doubled when the voltage is $V_{INT}$ since the charges are accumulated evenly in both two potential wells constituting one picture element.

Since the charges accumulated in this state are added to one of those two potential wells by supplying a shift pulse to the memory part, if the phase of this shift pulse is inverted in dependence upon the odd-number fields and even-number fields, the combination of the two wells to be added will be changed, thereby enabling the substantially interlaced charge information to be obtained.

Figure 8:
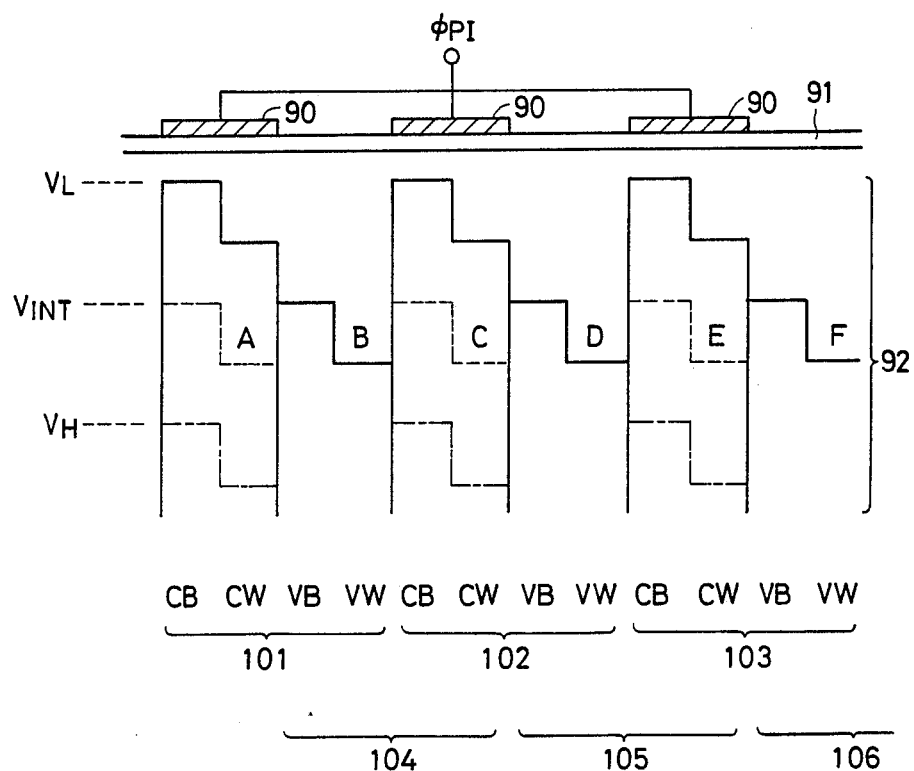
FIG. 8 is a diagrammatical view to explaining a method of controlling potential wells according to the present invention.

FIG. 8 is a diagrammatical view for explaining method of forming such potential wells and a structure of the radiation receiving section of the present invention.

In FIG. 8, a reference numeral 90 indicates transfer electrodes in the case of a CCD of the single-phase drive type to which the clock pulse $\phi_{PI}$ is applied. A number 91 represents an insulative layer formed on a semiconductor substrate 92.

The virtual electrodes are formed in the VB and VW regions because the CCD in this embodiment is single-phase driven. In addition, potential stairs such as shown in FIG. 8 have been preliminarily formed in the VB and VW regions due to ion implantation or the like, so that the potentials in these regions are always constant. Potential level differences have been also similarly formed in the CB and CW regions due to ion implantation or the like.

The potential levels of those CB and CW regions change in response to the voltage level to be applied to the electrodes 90. For example, as shown in FIG. 8, when $V_L$ is applied, the potential well region CW becomes shallow; while, when $V_H$ is applied, it becomes deep. Such a CCD structure is publicly known.

Moreover, when the voltage $V_{INT}$ at the intermediate level mentioned above is applied, the potential levels of the VB and VW regions are substantially equal to the levels of the CB and CW regions, respectively.

Figure 3:
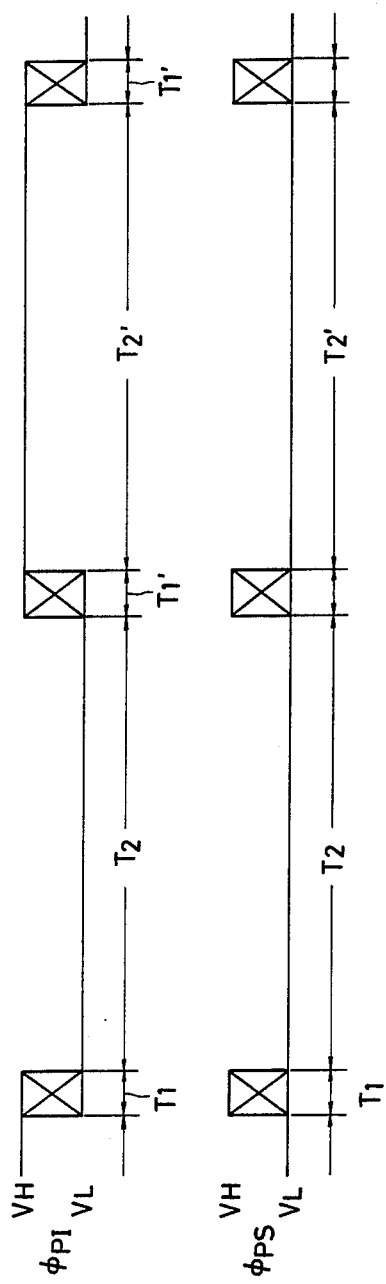
FIG. 3 is an explanatory diagram of pulses for driving a conventional image sensor.

Consequently, in a conventional image pickup apparatus, for example as shown in FIG. 3, since the low-level voltage $V_L$ is applied to the electrodes 90 in the odd-number field accumulation period $T_2$, the potentials become as shown by the solid lines in FIG. 8, so that the charges in picture element ranges 101, 102 and 103 are accumulated in the regions VWs, respectively.

On the other hand, in the accumulation state of the fields bearing even numbers as shown in FIG. 3, $V_H$ is applied to the electrodes 90, so that the charges in picture element ranges 104, 105 and 106 are accumulated in the regions CWs, respectively.

Therefore, by changing over the bias voltage to the transfer electrodes for every field, the wells in which the charges are stored are shifted, thereby making the interlacing possible. However in this case, flickers are caused as mentioned before.

On the contrary, according to the present invention, in the movie mode, the intermediate voltage $V_{INT}$ is applied to the transfer electrodes 90 in both odd-number and even-number fields, thereby to prevent such flickers. In addition, to perform the interlacing, by inverting the clock pulses upon vertical charge transfer for every field, the charges A–F stored in each of the potential wells CW and VW are added as for example (B+C) and (D+E) and thereafter they are transferred if the clock $\phi_{PI}$ begins from the high level; while, if the clock $\phi_{PI}$ begins from the low level, the charges A–F are added as (A+B), (C+D) and (E+F) and thereafter they are transferred. As a result of this, an interlace effect can be obtained.

The above description relates to the apparatus according to the single-phase drive method; however, the present invention can be, of course, also applied to a drive method of two or more phases.

As described above, by providing means for selecting either of the movie mode and still mode, the present solid-state image pickup apparatus can be commonly used for both movie video and still video, so that it is possible to relatively cheaply obtain a CCD VTR. Furthermore, the solid-state image pickup apparatus can be easily individually used in dependence upon the objects of the particular use.

In addition, in the movie mode, the levels of two potential wells constituting one picture element are made identical and by changing over the phase of the shift clock pulse to the memory part in dependence upon the even-number fields and odd-number fields, the interlace effect is obtained. Due to this, the noise levels of the dark current and the like are averaged for every field. On one hand, in the still mode, the switching operation is controlled by the mode change circuit 5 as control means so that the noise levels of these dark current and the like are minimized, so that an optimum S/N ratio can be always obtained. Therefore, it is also possible to obtain a high-quality picture image signal with a wide dynamic range.

We claim:

1. An image pickup apparatus comprising:
   (a) a radiation receiving section including a plurality of picture elements adapted to receive radiation from an object;
   (b) at least one electode for controlling a potential in each picture element; and
   (c) control means having a first mode in that said electrode is controlled so as to respectively form one potential well in each picture element for charge accumulation, and a second mode in that said electrode is controlled so as to respectively form a plurality of potential wells in each of said picture elements for charge accumulation.

2. An image pickup apparatus according to claim 1, wherein said radiation receiving section includes a semiconductor substrate and an insulative layer formed on said semiconductor substrate.

3. An image pickup aparatus according to claim 2, wherein said electrode is arranged so as to control a potential in said semiconductor substrate through said insulative layer.

4. An image pickup apparatus according to claim 1, further including recording means for recording signals obtained by said plurality of pictures elements.

5. An image pickup apparatus according to claim 4, further including instruction means for selectively outputting a first instruction signal to instruct said recording means to record the signal of one screen obtained by said plurality of picture elements and a second instruction signal to instruct the recording means to record the signals of a plurality of screens obtained by said plurality of picture elements.

6. An image pickup apparatus according to claim 5, further including means for switching between first and second modes of said control means in response to the output of said instruction means.

7. An image pickup apparatus according to claim 6, wherein said control means is switched by said switching means to the first mode in respnse to the first instrucion signal and to the second mode in response to the second instruction signal.

8. An image pickup apparatus according to claim 1, wherein said control means controls said electrode in a manner such that a depth of the potential well for charges in said first mode is shallower than a depth of the potential well for charges in said second mode.

9. An image pickup apparatus comprising:
   (a) a radiation receiving section including a plurality of picture elements adapted to receive radiation from an object;
   (b) at least one electrode for controlling a potential in each picture element; and
   (c) control means having a first mode in which said electrode is controlled so as to respectively form one potential well in each of said picture elements for charge accumulation and in which said electrode is controlled so as to sequentially read out the charges in each of said potential wells when reading out the charges, and having a second mode in which said electrode is controlled so as to respectively form a plurality of potential wells in each of said picture elements for charge accumulation and in which said electrode is controlled so as to mix the charges in each of said potential wells and to sequentially read out the charges when reading out the charges.

10. An image pickup apparatus according to claim 9, wherein said radiation receiving section includes a semiconductor substrate and an insulative layer formed on said semiconductor substrate.

11. An image pickup apparatus according to claim 10, wherein said electrode is arranged so as to control a potential in said semiconductor substrate through said insulative layer.

12. An image pickup apparatus according to claim 9, further including recording means for recording signals obtained by said plurality of picture elements.

13. An image pickup apparatus according to claim 12, further including instruction means for selectively outputting a first instruction signal to instruct said recording means to record the signal of one screen obtained by said plurality of picture elements and a second instruction signal to instruct the recording means to record the signals of a plurality of screens obtained by said plurality of picture elements.

14. An image pickup apparatus according to claim 13, further including means for switching between said first and second modes of said control means in response to the output of said instruction means.

15. An image pickup apparatus according to claim 14, wherein said control means is switched by said switching means to the first mode in response to the first instruction signal and to the second mode in response to the second instruction signal.

16. An image pickup apparatus according to claim 9, wherein said control means controls said electrode in a manner such that a depth of the potential well for charges in said first mode is shallower than a depth of the potential well for charges in said second mode.

17. An image pickup apparatus comprising:
   (A) a semiconductor substrate provided with a plurality of potential wells which store an electrical signal generated in response to incident radiation;
   (B) control means for applying a predetermined electric field onto said substrate to control the state of said potential wells, said control means including the following drive modes:
      (1) a first drive mode wherein said electric signal is stored by keeping said potential wells in a first fixed state, and
      (2) a second drive mode wherein said electric signal is stored by keeping said potential wells in a second fixed state so that the amount of said electric signal due to a dark current generated in said potential wells is smaller than that in said first drive mode:
   (C) recording means for recording information corresponding to said electric signal generated in said substrate, said recording means including a first recording mode for recording one image field of information obtained in said plurality of potential wells and a second recording mode for recording information of a plurality of image fields; and (D) means for selecting between the first and second drive modes of said control means in accordance with the recording mode.

18. An image pickup apparatus according to claim 17 wherein said control means has a third drive mode for changing the state of said potential wells to transfer said electric signal.

19. An image pickup apparatus according to claim 17 wherein said selecting means causes selection by said control means of the second drive mode for the first recording mode and of the first drive mode for the second recording mode.

20. An image pickup apparatus according to claim 17 wherein said recording means is a magnetic recording unit.

21. An image pickup apparatus according to claim 17 wherein said potential wells in said first drive mode are deeper than those in said second drive mode.

22. An image pickup apparatus comprising:
(A) a substrate provided with a plurality of pixels each of which includes at least one potential well for storing an electric signal generated in response to incident radiation; and
(B) control means for applying a predetermined electric field onto said substrate to control the state of said potential wells, the control means having the following drive modes:
  (1) a first drive mode wherein said electric signal is accumulated by fixedly forming a plurality of potential wells at each of said pixels;
  (2) a second drive mode wherein said electric signal is accumulated by fixedly forming one potential well at each of said pixels; and
  (3) a third drive mode wherein said accumulated electric signal is transferred by changing the state of the potential wells in said pixels.

23. An image pickup apparatus according to claim 22 wherein said control means includes an insulation layer provided in said substrate and an electrode for applying an electric field to said substrate through said insulation layer.

24. An image pickup apparatus according to claim 22 wherein said control means controls the state of said potential wells in said first drive mode subsequent to said second and third drive mode.

25. A drive device adapted to drive a radiation receiving device including a plurality of picture elements for receiving radiation comprising:

first means for causing said radiation receiving device to form one potential well in each of said picture elements for charge accumulation; and
second means for causing said radiation receiving device to form a plurality of potential wells in each of said picture elements for charge accumulation.

26. A drive of claim 25 further comprising means for selecting said first means and said second means.

27. A drive device of claim 26 further comprising means for driving said first means and said second means to transfer the charge accumulated in said picture elements after the charge accumulation.

28. A drive device of claim 25, wherein said drive device forms the potential well by applying an electrical field to said radiation receiving device.

29. A drive device of claim 28, wherein the potential wells formed by said second means are deeper than the potential well formed by said first means.

30. A drive device adapted to drive a semiconductor device having a substrate provided with a plurality of picture elements which accumulate an electrical signal generated in response to incident radiation comprising:
control means for applying a predetermined electric signal onto said substrate to control the state of said picture elements, said control means including the following drive modes:
a first drive mode wherein said electric signal is accumulated by keeping said picture elements in a first fixed state, and
a second drive mode wherein said electric signal is accumulated by keeping said picture element in a second fixed state so that the amount of said electric signal due to a dark current generated in said picture elements is smaller than that in said first drive mode;
means for selecting between the first and second drive modes of said control means in accordance with a picture taking mode including a still picture taking mode and a movie picture taking mode.

31. A drive device of claim 30, wherein said control means controls a state of the potential wells in said picture elements.

32. A drive device of claim 30, wherein said control means applied a predetermined electric field onto said substrate to control the state of said picture elements.

33. A drive device of claim 30, wherein said selecting means selects the first drive mode in accordance with the movie picture taking mode and selects the second drive mode in accordance with the still picture taking mode.

34. A drive device of claim 30, further comprising means for performing a changeover between said picture taking modes.

* * * * *

UNITED STATES PATENT AND TRADEMARK OFFICE
CERTIFICATE OF CORRECTION

PATENT NO. : 4,712,135
DATED : December 8, 1987
INVENTOR(S) : SEIJI HASHIMOTO, ET AL.

It is certified that error appears in the above-identified patent and that said Letters Patent is hereby corrected as shown below:

COLUMN 1
    Line 4, "applicaiton" should read --application--.

COLUMN 2
    Line 68, "of" should be deleted.

COLUMN 3
    Line 30, "is" (second occurrence) should be deleted.
    Line 37, "and" should be deleted.
    Line 56, "to" should read --for--.

COLUMN 5
    Line 13, "supersmallsized" should read --supersmall-sized--.
    Line 67, "explaining" should read --explaining a--.

COLUMN 6
    Line 23, "$V_{INT}at$" should read --$V_{INT}$ at--.

COLUMN 7
    Line 11, "circuit 5" should read --circuit 50--.
    Line 22, "electode" should read --electrode--.
    Line 35, "aparatus" should read --apparatus--.
    Line 41, "pictures" should read --picture--.
    Line 57, "respnse" should read --response--; "instru-" should read --instruc- --.
    Line 58, "cion" should read --tion--.

UNITED STATES PATENT AND TRADEMARK OFFICE
CERTIFICATE OF CORRECTION

PATENT NO. : 4,712,135
DATED : December 8, 1987
INVENTOR(S) : SEIJI HASHIMOTO, ET AL.

It is certified that error appears in the above-identified patent and that said Letters Patent is hereby corrected as shown below:

COLUMN 8
    Line 66, "mode:" should read --mode;--.

COLUMN 10
    Line 7, "drive of" should read --drive device of--.
    Line 31, "element" should read --elements--.

Signed and Sealed this

Thirty-first Day of May, 1988

Attest:

DONALD J. QUIGG

Attesting Officer      Commissioner of Patents and Trademarks